UNITED STATES PATENT OFFICE.

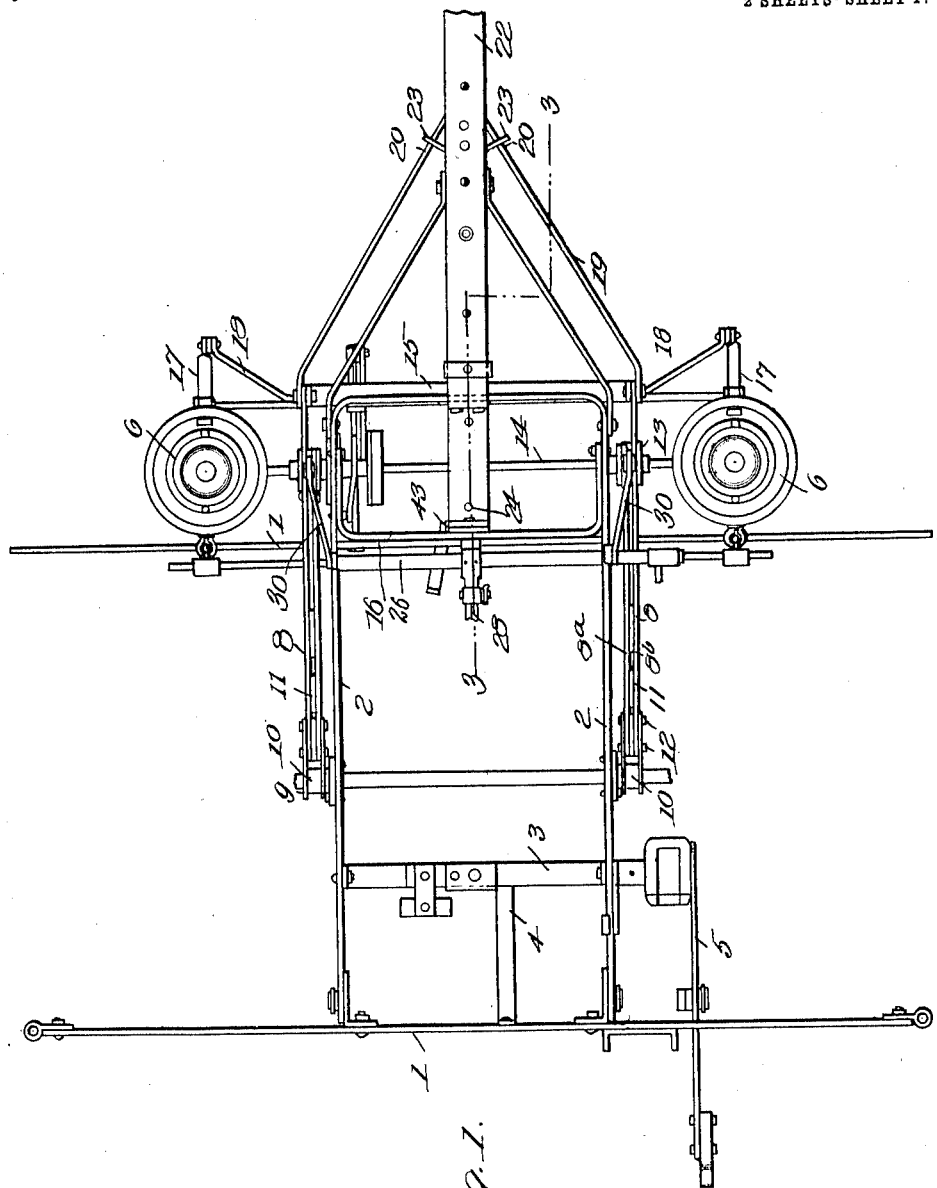

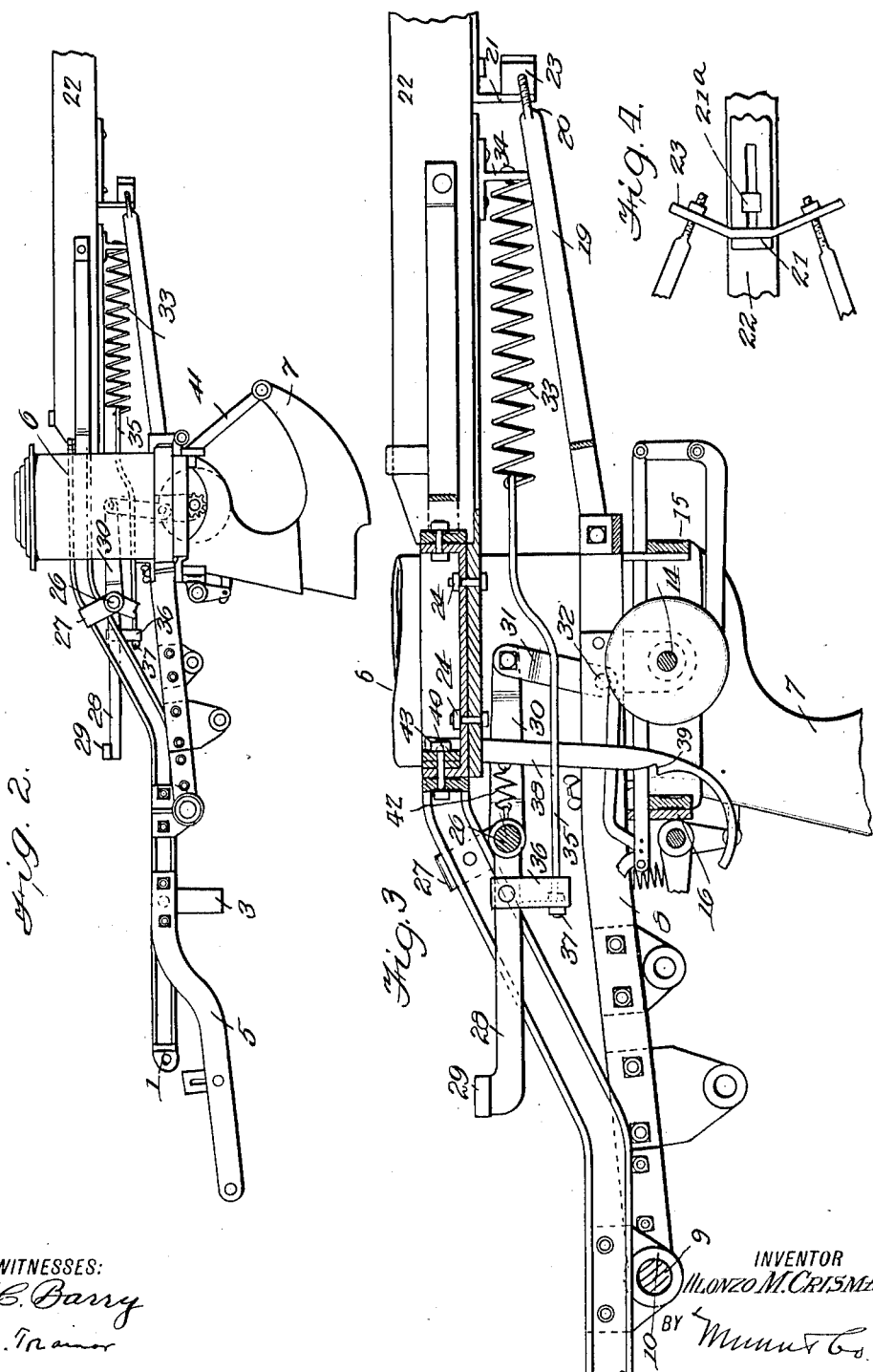

ALONZO M. CRISMAN, OF DAVENPORT, IOWA.

PLANTER-FRAME.

1,061,456.  Specification of Letters Patent.  Patented May 13, 1913.

Application filed May 19, 1910. Serial No. 562,116.

*To all whom it may concern:*

Be it known that I, ALONZO M. CRISMAN, a citizen of the United States, and a resident of Davenport, in the county of Scott and State of Iowa, have made certain new and useful Improvements in Planter-Frames, of which the following is a specification.

My invention is an improvement in planter frames, and consists in certain novel constructions and combinations of parts, hereinafter described and claimed.

The object of the invention is to provide an auxiliary or front non-tilting frame for the seed boxes and furrow openers for planters of the type shown and described in my copending application Serial No. 562,113, filed May 19, 1910, and patented June 13, 1911, No. 995,225, to insure that the furrow openers will follow a more uniform depth, and wherein the frame will maintain itself in a level steady position, while at the same time the furrow openers may be moved into and out of the ground in an easier and more expeditious manner.

Referring to the drawings forming a part hereof—Figure 1 is a plan view of the frame, with the operating mechanism removed, Fig. 2 is a side view of Fig. 1, Fig. 3 is a longitudinal section on the line 3—3, and Fig. 4 is a bottom plan view of a portion of the tongue.

As is known, planters of the type in question hinge the front or auxiliary frame to the forward end of the main frame and tilt the said front or auxiliary frame to lift and lower the furrow openers, by reason of which the seed is not placed in the ground at a uniform depth, and to cure this defect the following mechanism is provided.

In the embodiment of the invention shown in the drawings, the main frame is composed of a pair of spaced parallel cross bars 1, connected by longitudinal bars 2, also spaced and parallel, and connected with the cross bars at a distance inwardly from their ends, so that each cross bar extends beyond the frame at both ends.

Each of the bars 1 and 2 is arranged with its widest dimension vertical. Near their rear ends the bars 2 are connected by a cross bar 3 arranged with its widest dimension horizontal, and designed to support the tripping mechanism shown in my above mentioned application and patent. The said bar 3 is connected to the adjacent bar 1 by a strap 4, and the measuring wheel frame 5 is pivoted to the end of the bar 3 which extends on one side beyond the bar 2.

The seed boxes or containers 6, and the furrow openers or runners 7 are supported on an auxiliary or front frame, connected to one end of a pair of arms 8, whose other ends are pivoted at 9 on bearings 10 for the axle of the planter. The arms 8 as shown are composed of two bars $8^a$ and $8^b$ spaced apart by spacing blocks 11 and held together by bolts 12.

A bearing 13 is provided at the outer or front end of each arm 8, and the seed plate driving shaft 14 is journaled in the bearings. The auxiliary frame is composed of parallel spaced bars 15 and 16, and the bars 15 and 16 are extended at each end as shown, to connect with longitudinal bars 17. The longitudinal bars 17 extend forwardly beyond the bar 15, and are braced thereto by braces 18.

Braces 19 extend forwardly from the auxiliary frame near each end and at their front ends the braces are reduced and threaded as shown at 20 and pass through lugs $21^b$ extending laterally from the depending portion 21 of an angle bracket, the other portion $22^a$ of which is slotted as shown at $21^b$, and is slidable on the lower face of the tongue, the slot being engaged by a bolt or screw $21^a$ and the said threaded portions are engaged by nuts 23. The tongue is secured to the main frame at 24, and a shaft 26 is journaled in bearings 27 on the main frame in rear of the auxiliary frame for lifting the same.

The shaft is provided at its center with a rearwardly extending arm or lever 28, having a foot plate 29, and at each end with a forwardly extending arm 30, connected by a link 31, with the auxiliary frame at 32. It will be evident that when the shaft is oscillated in the proper direction by depressing the foot plate the said frame will be lifted.

A spring 33 is connected at one end to a bracket 34 on the tongue and at the other to a link 35, which passes through a depending plate 36 on the bar or lever 28, and is engaged by nuts 37, one on each side of the plate. The spring acts as a counterbalance to assist the operator in raising the frame. The arrangement of the spring is such that when the shaft is in the normal position shown in Figs. 2 and 3 the pull of the spring is at the dead center, and consequently does not affect the shaft until the foot plate is depressed.

As a depth regulator the spring 33 operates as follows: The auxiliary frame which carries the furrow openers is of such weight, that the furrow openers would be forced to a too great depth in the soil if no means were provided for partially supporting the frame and the furrow openers. For this purpose the spring is connected to the lever 28, and a part of the weight is thus carried in the main frame. The spring tends to pull the end of the lever provided with the foot plate downwardly and thus assists in supporting the weight of the auxiliary frame and the furrow openers. It will be evident that if the tension of the spring were increased, the auxiliary frame and the furrow openers would be held at a higher level than would be the case if the tension of the spring were decreased.

The tension of the spring may be regulated by the nuts 37, and the said spring acts as a depth regulator, holding the runners at the proper depth, and keeping them uniformly at the said depth. A latch 38 is provided for holding the frame in raised position, with the runners out of the ground, the said latch having a notch 39 for engaging the bar 16 when the frame is in its highest position, and the said latch is pivoted to the main frame at 40, so that it may be easily detached from the auxiliary frame.

It will be evident that when the foot plate 29 is depressed, the auxiliary frame, together with the seed boxes and the runners, will be lifted bodily vertically while maintaining a horizontal position and there will be no tilting in either direction. The seed boxes are supported between the bars 15 and 16 as are also the runners, and the front end of each runner is connected to the auxiliary frame by a brace 41.

The auxiliary frame swings on the arms 8 and the angle bracket 21 which carries the lugs 21$^b$ may slide forwardly on each tongue when the frame is lifted, so that it will not interfere with the lifting movement.

A spring 42 is provided for holding the latch 38 in position for engagement by the bar 16, and when the frame is to be lowered, the upper end 43 of the latch is engaged by the foot to swing the same to release the bar.

I claim:

1. In a planter of the character specified, a main frame, a tongue connected with the front end thereof, an axle journaled transversely in the frame at approximately the center thereof, arms pivoted at one end on the axle at each end of the main frame and outside of the same and extending forwardly, an auxiliary frame secured to the outer ends of the arms, a seed box supported in the auxiliary frame at each end thereof and outside of the main frame, a furrow opener below each seed box, a shaft journaled transversely of the main frame near the front thereof, an arm extending rearwardly from the center of the shaft, a foot plate on the arm, an arm extending forwardly from the shaft at each end thereof, a link connecting each arm with the auxiliary frame, a spring connected at one end with the tongue, a link connected with the other end of the spring, a bracket depending from the foot plate arm, the link passing through the bracket, a nut engaging the link on each side of the bracket, said spring normally holding the auxiliary frame in elevated position, a catch pivoted to the main frame, and having means for engaging the auxiliary frame, and a spring normally pressing the catch into engagement with the auxiliary frame.

2. In a planter of the character specified, a main frame, a tongue connected with the front end thereof, an axle journaled transversely on the frame at approximately the center thereof, arms pivoted at one end on the axle at each end of the main frame and outside of the same and extending forwardly, an auxiliary frame secured to the outer ends of the arms, a seed box supported in the auxiliary frame at each end thereof and outside of the main frame, a furrow opener below each seed box, a shaft journaled transversely of the main frame near the front thereof, an arm extending rearwardly from the center of the shaft, a foot plate on the arm, an arm extending forwardly from the shaft at each end thereof, a link connecting each arm with the auxiliary frame, a spring connected at one end with the tongue, a link connected with the other end of the spring, a bracket depending from the foot plate arm, the link passing through the bracket, a nut engaging the link on each side of the bracket, said spring normally holding the auxiliary frame in elevated position, and means for holding the auxiliary frame in elevated position.

3. In a planter of the character specified, a main frame, a tongue connected with the front end thereof, an axle journaled transversely of the frame, arms pivoted on the axle, an auxiliary frame for supporting the seed boxes and furrow openers secured to the arms, a shaft on the main frame, a foot plate for oscillating the shaft, arms extending forwardly from the shaft, links connecting the arms with the auxiliary frame, a spring for holding the frame in elevated position, and means for regulating the tension of the spring.

4. In a planter of the character specified, a main frame, a tongue connected with the front end thereof, an axle journaled transversely of the frame, arms pivoted on the axle, an auxiliary frame for supporting the seed boxes and furrow openers secured to the arms, a shaft on the main frame, means for oscillating the shaft, a connection between the shaft and the auxiliary frame for lifting the same when the shaft is oscillated, links pivoted to the front of the auxiliary frame and having a sliding connection with the tongue, a spring for holding the auxiliary frame in elevated position, and means for holding the frame in elevated position.

5. In a planter of the character specified, a main frame, a tongue connected with the front thereof, an axle journaled transversely of the frame, arms pivoted to the axle and extending forwardly, an auxiliary frame on the front ends of the arms for supporting the seed boxes and furrow openers, links pivotally connected with the auxiliary frame and having a slidable connection with the tongue, means for lifting said frame vertically, means for holding it in its lifted position, and a spring for holding it in elevated position.

6. In a planter of the character specified, a main frame, a tongue connected with the front thereof, an axle journaled transversely of the frame, arms pivoted to the axle and extending forwardly, an auxiliary frame on the front ends of the arms for supporting the seed boxes and furrow openers, links pivotally connected with the auxiliary frame and having a sliding connection with the tongue, means for lifting said frame vertically, a spring for holding it in elevated position, and means for regulating the tension of the spring.

7. In a planter of the character specified, a main frame, a tongue connected with the front thereof, an axle journaled transversely of the main frame, arms pivoted to the axle and extending forwardly, an auxiliary frame on the front ends of the arms for supporting the seed boxes and furrow openers, links pivotally connected with the auxiliary frame and having a sliding connection with the tongue, means for lifting said frame vertically, and a spring for holding it in elevated position.

8. In a planter of the character specified, a main frame, a tongue connected with the front thereof, an axle journaled transversely of the frame, arms pivoted to the axle and extending forwardly, an auxiliary frame on the front ends of the arms for supporting the seed boxes and furrow openers, means for lifting said frame vertically, means for guiding said frame in its vertical movement, a spring for holding the frame in lowered position, means for regulating the tension of the spring, and independent means for holding the frame in lifted position.

9. In a planter of the character specified, a main frame, a tongue connected with the front thereof, an axle journaled transversely of the frame, arms pivoted to the axle and extending forwardly, an auxiliary frame on the front ends of the arms for supporting the seed boxes and furrow openers, means for lifting said frame vertically, means for guiding said frame in its vertical movement, a spring for holding the frame in elevated position and means for regulating the tension of the spring.

10. In a planter of the character specified, a main frame, a tongue connected with the front thereof, an axle journaled transversely of the frame, arms pivoted to the axle and extending forwardly, an auxiliary frame on the front ends of the arms for supporting the seed boxes and furrow openings, means for lifting said frame vertically, means for guiding said frame in its vertical movement, and a spring for holding the frame in elevated position.

11. In a planter of the character specified, a main frame, a tongue connected with the front thereof, an axle journaled transversely of the frame, arms pivoted to the axle and extending forwardly therefrom, an auxiliary frame on the front ends of the arms for supporting the seed boxes and furrow openers, means for lifting said frame vertically, and a spring for holding it in elevated position.

12. In a planter of the character specified, a main frame, a tongue connected with the front thereof, an axle journaled transversely of the frame, arms pivoted to the axle and extending forwardly therefrom, an auxiliary frame on the front ends of the arms for supporting the seed boxes and furrow openers, means for lifting the frame vertically, and independent means for holding it in lifted position.

13. In a planter of the character specified, a main frame, an axle journaled transversely of the frame, arms pivoted to the axle and extending forwardly therefrom, an auxiliary frame on the ends of the arms, a spring for holding the frame in elevated position, and means for lifting the frame vertically.

14. In a planter of the character specified, a main frame, an axle journaled transversely thereof, arms pivoted on the axle and extending forwardly, an auxiliary frame for the seed boxes and furrow openers supported on the arms, means for lifting the auxiliary frame vertically, and a spring for holding the frame in elevated position.

15. In a planter of the character specified, a main frame, an auxiliary frame for supporting the seed boxes and the furrow openers, a swinging connection between the auxiliary frame and the main frame, a spring arranged between the main frame and the auxiliary frame for partially supporting the auxiliary frame, and means for varying the tension of the spring to regulate the depth of the furrow openers in the ground.

ALONZO M. CRISMAN.

Witnesses:
JOSEPH J. BRUS,
THOMAS SIEVERS.

Copies of this patent may be obtained for five cents each, by addressing the "Commissioner of Patents, Washington, D. C."